Patented Jan. 13, 1931

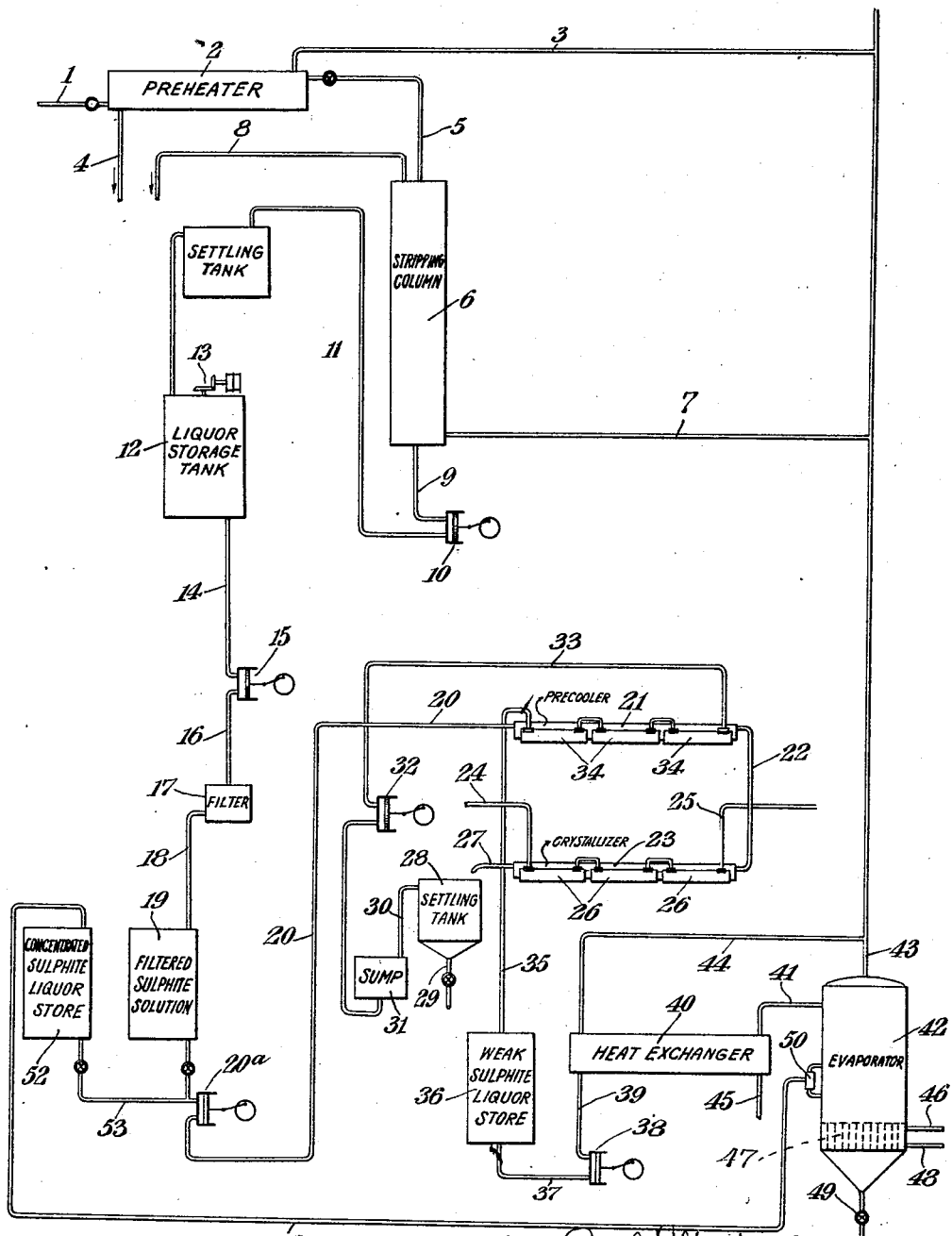

1,788,955

UNITED STATES PATENT OFFICE

CARL L. MASTERS, OF NITRO, WEST VIRGINIA, ASSIGNOR, BY MESNE ASSIGNMENTS, TO ELKO CHEMICAL COMPANY, A CORPORATION OF WEST VIRGINIA

PROCESS OF RECOVERING ALKALI METAL SULPHITES FROM FUSION LIQUORS

Application filed June 4, 1927. Serial No. 196,455.

My invention relates particularly to the recovery of sulphites of the alkali metals from fusion liquors obtained in the production of phenolic compounds.

The object of my invention is to provide a process for the recovery of alkali metal sulphites from fusion liquors obtained in the production of phenolic compounds, as, for example, such as are obtained in the production of phenol or beta naphthol.

It is well known that phenolic compounds are produced by the use of organic alkali metal sulphonates with alkali metal hydroxides according to the following reaction:

$$RSO_3H + 3MeOH \rightarrow ROMe + Me_2SO_3 + 2H_2O$$

Certain methods are known by which the phenolic compounds may be separated from the fusion product containing an excess of alkali, for example by the addition of an acid to the fusion product, which has been previously dissolved, for example, in accordance with the following reaction:

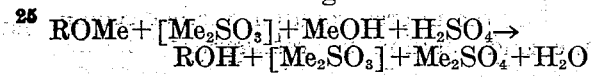

$$ROMe + [Me_2SO_3] + MeOH + H_2SO_4 \rightarrow ROH + [Me_2SO_3] + Me_2SO_4 + H_2O$$

In accordance with my process I utilize sulphur dioxide for this purpose, thus producing the free phenolic compound and an alkali metal sulphite, and avoiding contamination with undesirable solids which would be formed by the use of other acids. The sulphur dioxide used for this purpose may be obtained as a by-product in the manufacturing process used for the production of the sulphonic acid or in any other way. In accordance with my process, I am able to obtain the alkali metal sulphite entirely free from contamination with any of the phenolic compounds. Any residual amount of the phenolic compound, after the main portion thereof has been previously eliminated, is removed by steam distillation, although, if desired, other means may be employed for this purpose, as, for example, extraction with solvents, etc. In accordance with my process I utilize the crude liquor resulting from the treatment of the fusion product, obtained by the fusion of an organic metal sulphonate with an alkali metal hydroxide, with sulphur dioxide, and from which the greater part of the phenolic product has been removed by separation, decantation, etc. The solution thus obtained may be passed through a heat exchanger and then is preferably conducted to a stripping column. The steam for the stripping column is obtained from any suitable source but preferably from a pressure evaporator in which the residual liquors from the subsequent alkali metal sulphite crystallition are concentrated for further recovery of the sulphite therefrom. The sulphite liquors, thus, having been freed from the phenolic compounds by the stripping column, are filtered to remove the insoluble impurities and then conveyed to a crystallizing apparatus for the removal of a large percentage of the sulphite; after which the residual liquors are conveyed back to the pressure evaporator in the manner described.

While my invention is capable of being carried out in many different ways, for the purpose of illustration I shall describe only certain ways of carrying out the same hereinafter, and while it is capable of being carried out in connection with many different types of apparatus, I have shown only one type of apparatus in connection therewith in the accompanying drawings, in which—

The figure is a diagrammatic representation of an apparatus which may be used in accordance with my invention.

For example, in carrying out my invention, in the case where fusion liquors are used, resulting from the production of phenol, I start with the fusion liquor obtained from the fusion of an organic alkali metal sulphonate with sodium hydroxide and the product of which fusion, after the major portion of the phenol produced has been removed by decantation or otherwise, has been subjected to the action of sulphur dioxide. The liquid thus obtained is supplied by a pipe 1 to a preheater 2 which is preheated by means of a current of steam supplied by an inlet pipe 3, and which is exhausted through an outlet pipe 4. This preheated steam is supplied from a source which will be hereinafter described.

From the preheater 2 the liquid is conveyed by a pipe 5 to a stripping column 6 filled with Raschig rings or other filling material, or which may be a distilling column constructed in any other desired manner. In the column 6 the said liquid passes countercurrent to an upwardly flowing current of steam supplied through a pipe 7 entering the bottom of the column 6 and exhausted from the top of the column by a pipe 8 leading to any other suitable point for further use, if desired. In the course of the treatment of the liquid in the column 6 the phenol is entirely removed and the resultant liquid passes out of the bottom of the column 6 by means of a pipe 9 and thence to a pump 10 from which it is delivered by a pipe 11 to a liquor storage tank 12 provided with an agitator 13 driven from any suitable source of power. From this tank the liquor passes off by a pipe 14 to a pump 15 by which it is delivered through a pipe 16 to a filter 17 to remove any solid impurities. From this point the liquor is delivered by a pipe 18 to a tank 19 provided for receiving the filtered sulphite solution. The solution then passes by means of a valved pipe 20, which may contain a pump 20a, to a precooler 21 cooled in the manner hereinafter described. From the precooler the liquid containing some crystals passes out by a pipe 22 to a mechanical crystallizer 23 which is cooled by a current of any desired kind of refrigerant, supplied by an inlet 24 and carried off by an outlet pipe 25, which is adapted to pass through a jacket in the form of a series of chambers 26 located around the mechanical crystallizer. The overflow from this crystallizer 23 is discharged by a pipe 27 into a settling tank 28 from which the crystals of alkali metal sulphite separate out and are conveyed away by a valved pipe 29 to a centrifuge not shown, or any other suitable means for recovering the crystals from the liquid carried thereby. The supernatant liquor passes away from the tank 28 by a pipe 30 to a sump 31 and thence to a pipe 32 from which the liquid is delivered at a temperature of approximately 0° C. by a pipe 33 to a jacket in the form of a series of chambers 34 contained around the precooler 21, from which jacket the liquor passes out by a pipe 35 to a weak sulphite liquor storage tank 36. A pipe 37, having a pump 38 therein, withdraws the weak sulphite liquor therefrom and delivers the same by a pipe 39 to a heat-exchanger 40 supplied with steam as hereinafter described, from which the liquor is delivered by a pipe 41 to a pressure evaporator 42, from the top of which steam, at any desired pressure, is delivered by a pipe 43 having valved branches 7, 3 and 44. The valved branch pipe 44 is connected to the preheater 40, which has a discharge pipe 45 for the condensed steam. In the pressure evaporator, furthermore, there is a supply pipe 46 for boiler steam which communicates with an indirect steam heater 47 located near the lower portion of the pressure evaporator, and which has an outlet pipe 48 for the waste condensed steam. At the extreme lower end of the pressure evaporator 42 there is a valved cleanout pipe 49. The concentrated sulphite liquor is drawn off from the evaporator by a constant level overflow 50 having a pipe 51 leading to a concentrated sulphite liquor storage chamber 52 from which the concentrated sulphite liquor may be delivered by a valved outlet pipe 53 to the pipe 20.

It will be understood that my process may be carried out, also, with other phenolic compounds instead of the phenol just described, as, for example, beta naphthol.

While I have described my invention above in detail I wish it to be understood that many changes may be made therein without departing from the spirit of the same.

I claim:

1. The process of recovering an alkali metal sulphite from phenolic solutions containing the same which comprises removing the phenolic compound from said solution by distillation means, filtering the residual solution, cooling the filtered solution sufficient to crystallize therefrom the greater portion of the sulphite content, separating the crystals of alkali metal sulphite from the cooled solution, concentrating the residual solution by heating means and adding the concentrated solution to the said filtered solution.

2. The process of recovering an alkali metal sulphite from phenolic solutions containing the same which comprises removing the phenolic compound from said solution by distillation means, filtering the residual solution, cooling the filtered solution, further cooling the said solution by refrigerating means, separating the crystals of alkali metal sulphite from the cold solution, passing the cold solution in heat exchange relationship with the said filtered solution, concentrating the residual solution by heating means, and adding the concentrated solution to the said filtered solution.

3. The process of recovering an alkali metal sulphite from phenolic solutions containing the same which comprises removing the phenolic compound from said solution by distillation means, cooling the residual solution to a temperature at which crystallization of the alkali sulphite takes place, and separating the crystals from the cooled solution.

4. The process of recovering sodium sulphite from a phenol solution containing the same which comprises removing phenol from said solution by distillation means, filtering the residual solution, cooling the filtered solution sufficient to crystallize therefrom the greater portion of the sodium sulphite content, separating the crystals of sodium sulphite from the cooled solution, concentrating the residual solution by heating means, and adding the concentrated solution to the said filtered solution.

5. The process of recovering sodium sulphite from a phenol solution containing the same which comprises removing phenol from said solution by distillation means, filtering the residual solution, cooling the filtered solution, further cooling said solution to approximately 0° C. by refrigerating means, separating the crystals of sodium sulphite from the cold solution, passing the cold solution in heat exchange relationship with said filtered solution, concentrating the residual solution by heating means and adding the concentrated solution to the said filtered solution.

6. The process of recovering sodium sulphite from a phenol solution containing the same which comprises removing the phenol from said solution by distillation with steam, cooling the residual solution to a temperature of approximately 0° C. and separating the sodium sulphite crystals from the cooled solution.

In testimony that I claim the foregoing, I have hereunto set my hand this 22nd day of February, 1927.

CARL L. MASTERS.